United States Patent Office 3,106,675
Patented Oct. 8, 1963

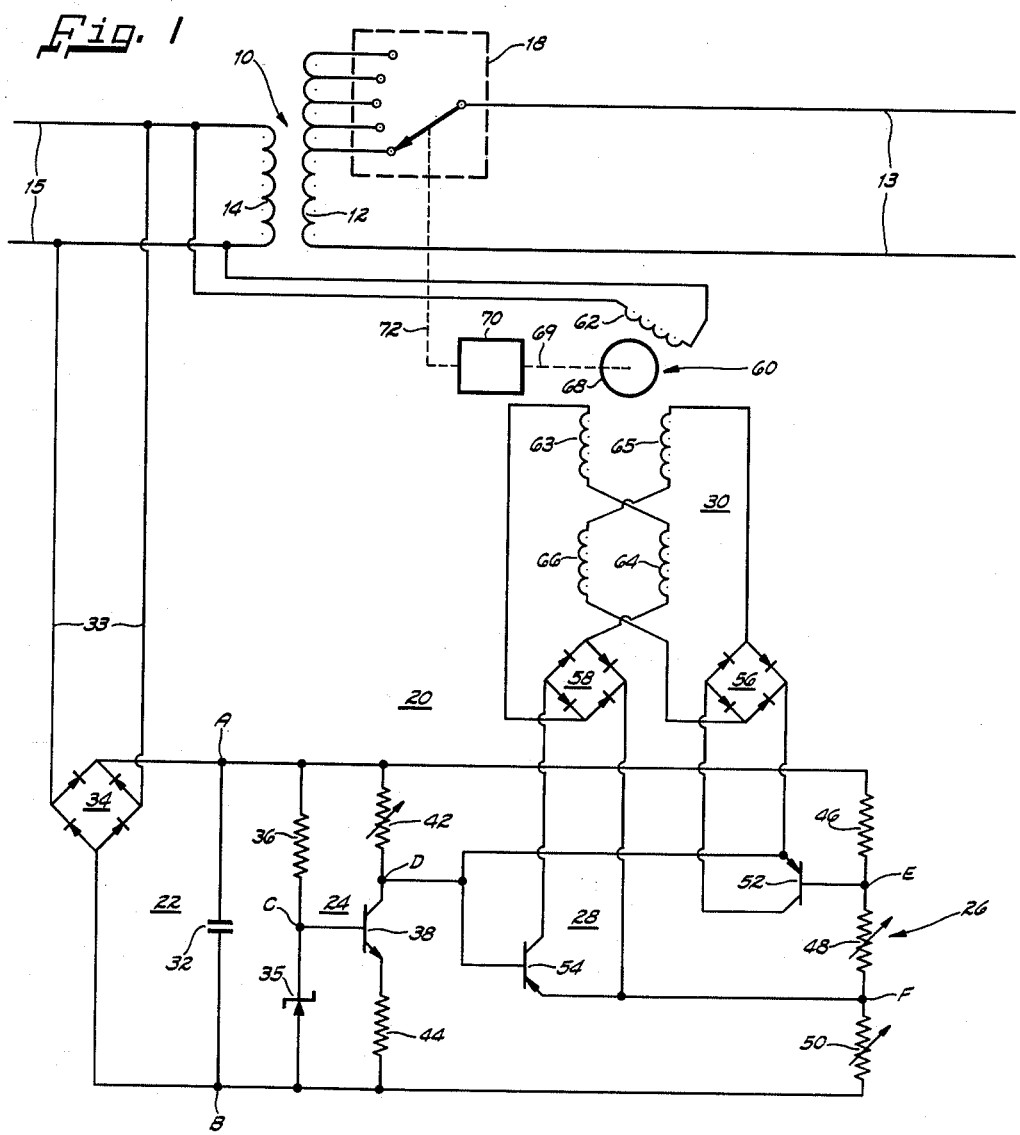

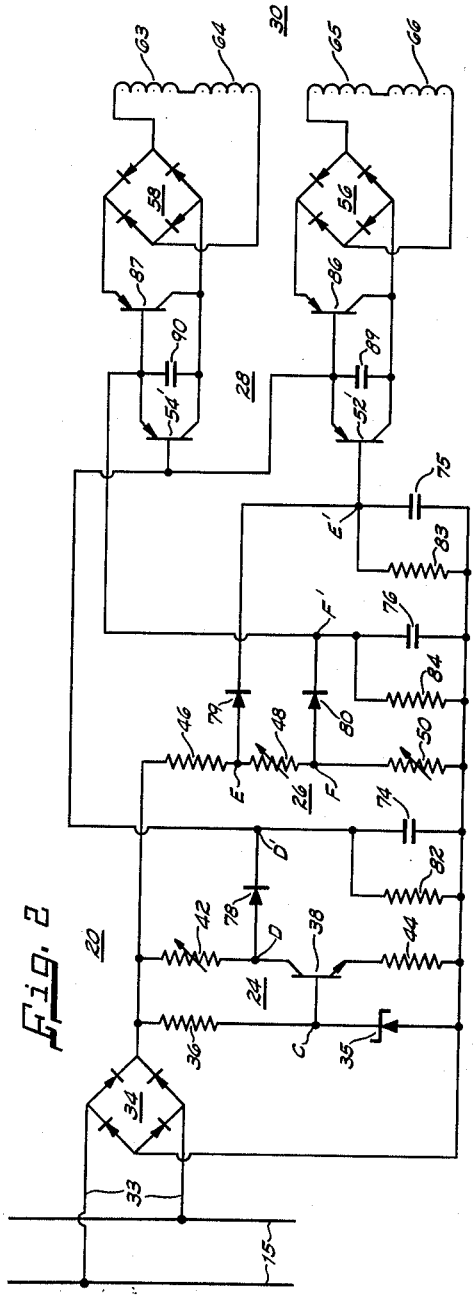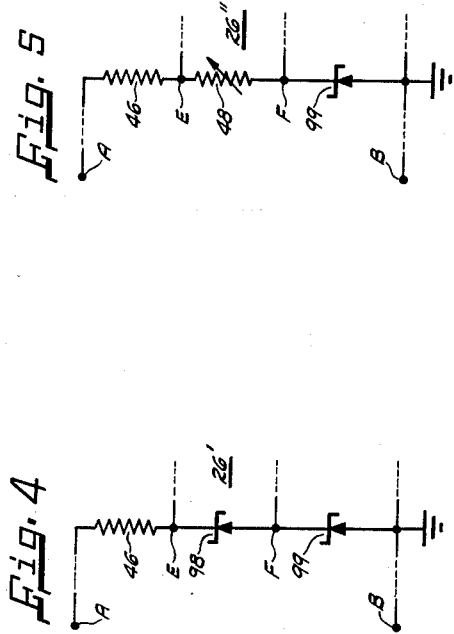

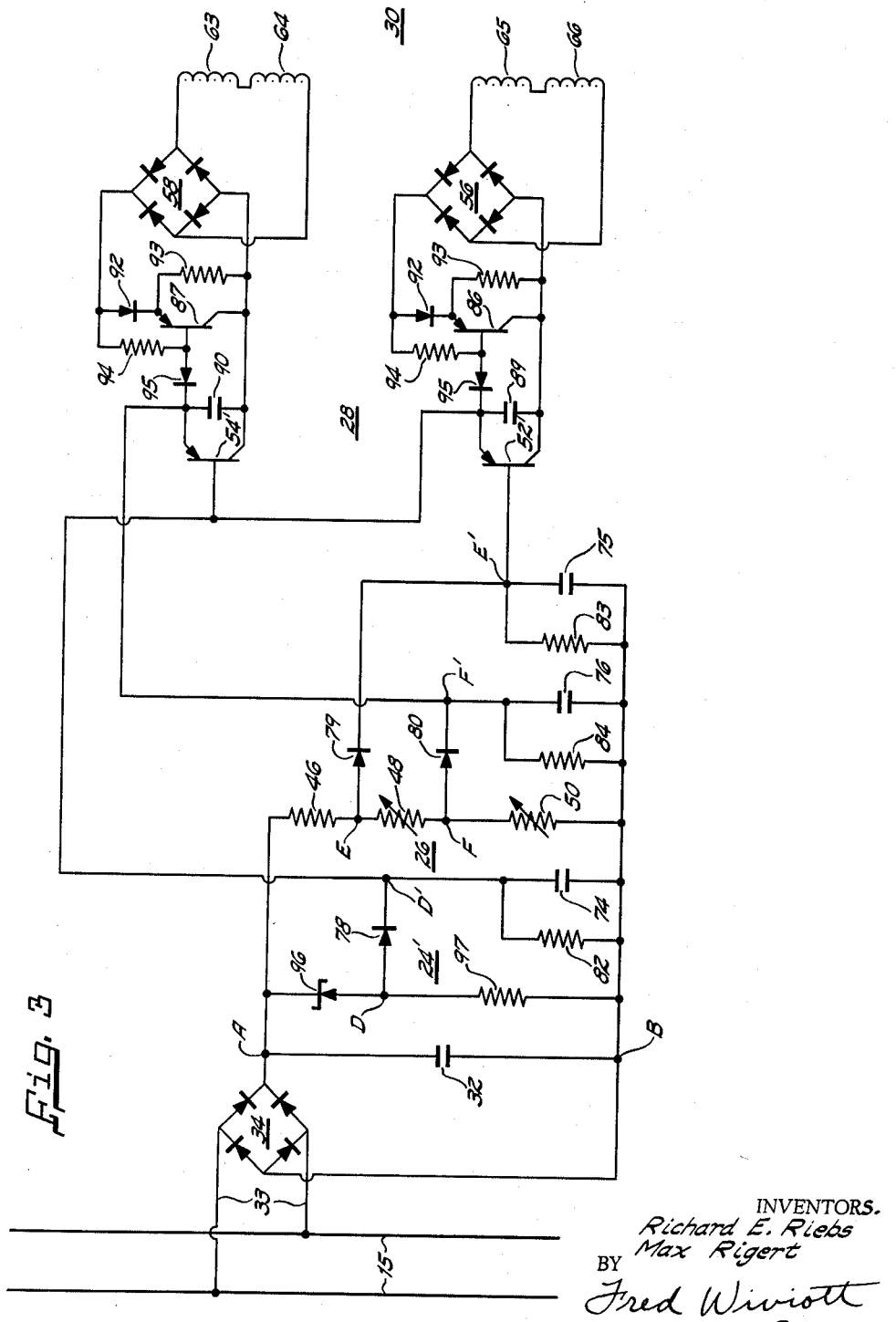

3,106,675
ELECTRONIC VOLTAGE REGULATOR WITH REVERSIBLE ELECTRO-RESPONSIVE OPERATOR MEANS
Richard E. Riebs, Hales Corners, and Max Rigert, West Allis, Wis., assignors to McGraw-Edison Company, Milwaukee, Wis., a corporation of Delaware
Filed May 28, 1959, Ser. No. 816,622
15 Claims. (Cl. 323—43.5)

This invention relates to an electrical control circuit having particular, but not exclusive, application to the control of a transformer tap changing apparatus.

In electric power and distribution systems, voltage regulating devices are often utilized to regulate the input voltage to the system in such a manner that the voltage at the load will be maintained at an economical and effective value relative to the ratings of the load devices. This is necessary, because in such systems, the power factor and magnitude of the load impedances are constantly changing as customers intermittently and randomly operate various electrical equipment. As a result of such load variations, the voltage loss in the source itself and in the distribution circuit connecting the source to the load, will also vary, necessitating compensatory changes in the source voltage.

Prior art voltage regulating devices were relatively expensive, thus preventing their adoption for use with certain types of apparatus such as distribution class transformers. In addition, prior art regulating devices proved unsatisfactory because they included contact making devices which operated whenever the source voltage rose above or fell below a predetermined value, thereby greatly increasing the maintenance required.

It is an object of the invention to provide a voltage regulating control circuit which is compact and economical.

Another object of the invention is to provide a voltage regulating control circuit which does not utilize contact making devices.

A further object of the invention is to provide a voltage regulating device which has particular but not exclusive application to a distribution transformer.

It is yet another object of the invention to provide a voltage regulating device whose bandwidth and an actuation voltage may be readily adjusted.

It is a still further object of the invention to provide a voltage regulating device whose moving parts are actuated only during tap changing operations.

These and other objects of the invention will become apparent from the detailed description of the invention taken in view of the drawings in which:

FIG. 1 is a circuit diagram of one embodiment of the instant invention;

FIGS. 2 and 3 are circuit diagrams illustrating alternate embodiments of the instant invention; and FIGS. 4 and 5 are further embodiments of various portions of the instant invention.

In general terms, the invention is designed to sense changes in a predetermined circuit condition, to determine when such changes exceed a predetermined value and to produce a reversible output signal for modifying the condition in a compensatory manner.

In its broadest aspect the invention comprises a circuit for controlling an electrical quantity in a system, and includes means for producing an electrical signal which varies in accordance with variations in the electrical quantity and means for raising the quantity when said signal falls below a first predetermined value and for lowering said quantity when said signal rises above a second predetermined value.

More specifically, the invention may also include a second circuit means for producing a pair of electrical signals having different magnitudes and which are substantially fixed with respect to the first electrical signal, and signal comparison means operable to lower said electrical quantity when the magnitude of the first electrical signal rises above said pair of signals and also operable to raise said electrical quantity when said first signal falls below said pair of signals. The invention may also include means for adjusting said first signal and said pair of signals so that the permissive range of said quantity can be adjusted. In addition, the signal comparison means may include time delay means so that the device will respond only to relatively permanent changes in said quantity.

The first circuit means includes, according to one embodiment of the invention, an impedance and means for holding the current in said impedance constant regardless of the voltage applied thereto. The latter means comprises a transistor whose base is connected to a source of constant voltage and wherein one of its other terminals is connected to said impedance. By applying a voltage to this first circuit means which is proportional to the system voltage, a first voltage signal appears at the other terminal of the transistor that varies in accordance with variations in the system voltage.

The second circuit means may include a relatively large impedance and at least one relatively small impedance. These impedances are so connected that when a voltage proportional to the system voltage is also applied to the second circuit means, a pair of voltage signals are produced at the opposite terminals of the relatively small impedance which have different values and which are substantially fixed relative to the first voltage signal.

If the device is to be used in an alternating current system, a capacitor means may be connected to the first and second circuit means to hold the applied voltage steady as the system voltage alternates.

The signal comparison means includes a first electronic means adapted to conduct when the potential at the other terminal of the transistor falls below that of one terminal of said relatively small impedance and a second electronic means adapted to conduct when the potential on said other transistor terminal rises above that on the other impedance terminal. If the device is used to regulate the secondary voltage in a transformer, a reversible motor means, actuable by the electronic means, may be provided to actuate a tap-changing device or the like.

According to another embodiment of the invention, the first circuit means includes a Zener diode and a resistor series connected to its negative terminal so that the potential on the junction between the two varies in accordance with variations in the applied voltage.

According to yet another embodiment of the invention, the second circuit means includes a resistance means and at least one Zener diode serially connected thereto in such a manner that the potential on the opposite terminals of said Zener diode have different values and are substantially fixed relative to the first voltage signal.

Referring now to the drawings in greater detail, FIG. 1 shows a transformer indicated generally by the reference numeral 10 and which is provided with a primary winding 12 connected to a power line 13 and a secondary winding 14 connected to a load line 15. A suitable snap acting tap changing device indicated generally by the reference numeral 18 is shown connected in the primary side of the transformer 10, although it could be connected in the secondary side as well, if desired. The tap changer 18 is merely schematically illustrated since the details thereof form no part of the invention, it being understood that any suitable well known tap changer may be utilized.

It will be further understood that while the invention is illustrated and described with respect to the control of a transformer tap changer, it may also be utilized in other types of electrical apparatus such as capacitor switches and voltage and current regulators wherein it is desired to maintain a circuit quantity within prescribed limits by compensating for deviations in said quantity which result from changes in the system parameters.

The tap changer control circuit 20, which comprises the instant invention, includes an input circuit 22 for coupling the control circuit to the load line 15, a first circuit means 24 coupled to the input circuit for producing a first voltage signal that varies in accordance with variations in the voltage in load line 15, a second circuit means 26 coupled to the input circuit for producing a pair of voltage signals having different magnitudes and which are substantially fixed relative to said first voltage signal and voltage signal comparison means 28 for determining when the voltage signal from said first circuit means rises above or falls below said pair of relatively fixed voltage signals. The signal comparison means 28 also includes motor means 30 actuable when said first voltage signal rises above or falls below the range of said relatively fixed voltage signals, to move tap changer 18 in a direction which will tend to compensate for such variations.

The input circuit 22 includes an input capacitor 32 coupled to load line 15 by conductors 33 and a bridge type rectifier 34. Capacitor 32 performs the function of holding the input voltage to the first and second circuit means steady as the voltage in load line 15 alternates. This input voltage is equal to the peak value of the alternating voltage in the load line 15.

The first circuit means 24 of the embodiment of FIG. 1, includes a transistor 38 of the NPN type whose collector is connected to the positive terminal A of input capacitor 32 through a first adjustable resistor 42, and whose emitter is connected to the negative terminal B of said capacitor through resistor 44. The base of transistor 24 is connected to a suitable constant potential source, which in the illustrated embodiment comprises a Zener diode 35 and a resistor 36 serially connected across the input capacitor 32. Because the voltage across the input capacitor 32 greatly exceeds the Zener voltage of diode 35, a current will flow through diode 35 and resistor 36 which holds the potential at junction point C, between the base of transistor 38 and diode 35, at the breakdown potential of said diode. The latter connection places the base and emitter of transistor 38 and resistor 44 in shunt with Zener diode 35 so that the emitter current of said transistor is equal to the Zener voltage of diode 35 divided by the resistance of resistor 44. The resulting collector current in transistor 38, which is substantially equal to its emitter current, flows through resistor 42. Because the Zener voltage of diode 35 is constant, the emitter, and therefore, the collector current of transistor 38 will also be substantially constant over a wide range of applied voltages. As a result, by holding the voltage applied to the first circuit means within this range, the current in resistor 42, and hence, the voltage drop across it, can be held substantially constant regardless of the applied voltage. It can be seen, therefore, that potential at junction point D, between resistor 42 and the collector of transistor 38, is equal to the difference between the potential at terminal A and the voltage drop across resistor 42. However, because the voltage drop across this resistor is constant over the normal range of operating voltages, the potential at junction point D will vary through the same number of volts as the voltage between terminals A and B, which is also the peak voltage in load line 15. In this manner, a voltage signal is produced at junction point D which varies in accordance with variations in the voltage in load line 15. The actual potential on junction point D can be adjusted by making resistor 42 adjustable as shown in FIG. 1.

The second circuit means 26 of the embodiment of FIG. 1, is also connected across terminals A and B of input capacitor 32 and includes a relatively large resistor 46, and a pair of relatively small resistors 48 and 50. It can be seen that the potentials at junction points E and F, between resistors 46 and 48 and between resistors 48 and 50 respectively, vary in direct proportion to changes in the applied voltage. In order to insure that these potentials are substantially constant in the operating range of the device, the resistance of resistor 46 is much larger than that of resistors 48 or 50 so that the voltage drop across resistor 46 will be substantially the entire applied voltage. As a result, the changes in potential at junction points E and F are only a small fraction of the changes in the total applied voltage so that these potentials can be considered relatively fixed with respect to the potential at junction point D, which changes directly with changes in the applied voltage. In this manner, a pair of voltage signals are produced at junction points E and F whose values are different from each other and which are substantially fixed with respect to the potential at junction point D. The absolute magnitude of the potentials at junction points E and F can be adjusted by making the relatively small resistors 48 and 50 adjustable as shown in FIG. 1.

The signal comparison circuit 28 shown in FIG. 1, includes a first PNP type transistor 52 whose emitter is connected to junction point D and whose base is connected to junction point E and a second PNP transistor 54 whose emitter is connected to junction point F and whose base is connected to junction point D. The emitter and collector of each of the transistors 52 and 54 are connected to the output terminals of bridge type rectifiers 56 and 58 respectively, which form a part of the motor means 30. The purpose of these connections will be more fully explained in the ensuing paragraphs.

Motor means 30 also includes a shaded pole reversible motor having a main winding 62 connected to any suitable source of alternating current, such as load conductors 15, a pair of series connected forward shading windings 63 and 64 and a pair of series connected reverse shading windings 65 and 66. The series connected forward shading windings 63 and 64 are connected to the input terminals of bridge type rectifier 58 and the series connected reverse shading windings 65 and 66 are connected to the input terminals of bridge type rectifier 56. Shaded pole motor 60 also includes a rotor 68 whose output shaft 69 is connected to tap changer 18 through a suitable gear reduction means 70. While a shaded pole motor 60 is illustrated in FIG. 1, this is merely intended as an example, it not being intended to limit the invention to any particular type of motor, since it will be understood that other types of reversible motors may also be utilized.

In operation of the embodiment of FIG. 1 adjustable resistors 42, 48 and 50 are adjusted so that the potential at junction point D will be lower than the potential at junction point E and above the potential at junction point F when the voltage in load line 15 is within the desired range or band width. It can be seen that under this condition of operation, the transistor 52 base potential will exceed its emitter potential so that it will be non-conductive. Similarly, the transistor 54 base potential also exceeds its emitter potential so this transistor will also be non-conductive. Because neither of the transistors 52 and 54 are conductive, each of the pairs of shading windings 63—64 and 65—66 are open circuited so that the rotor 68 of the shaded pole motor 60 is at rest. This condition will prevail as long as the voltage in the load line 15 falls within a predetermined range of values.

Assume now that a large electrical load is suddenly added to the load line 15, as occurs, for example, when a large electrical machine or heavy appliance is suddenly turned on. Because of losses in the transformer 10 and in the load line 15 itself, the voltage in said load line suddenly drops a few volts, depending on the size of the additional load. This drop in the peak voltage in load line 15 causes a drop in the rectified voltage across capacitor 32 whereupon it will discharge slightly through the first and second circuit means 24 and 26 until the voltage across it again equals the peak voltage in load line 15.

It will be recalled that because the current flowing in resistor 42 remains constant, even though the voltage A—B changes, the voltage drop between points A and D also remains constant, so that any change in the voltage A—B causes an equal change in potential at junction point D. If the reduction in load line 15 voltage is sufficient to lower the potential at junction point D below the potential at junction point F, the transistor 54 emitter potential will exceed its base potential and the transistor will begin conducting. This short circuits the forward shaded pole windings 63 and 64 so that rotor 68 will begin turning in a direction tending to move tap changer 18 downwardly, thereby reducing the number of turns in the primary winding 12 of transformer 10. This, of course, raises the voltage in the secondary winding 14 of transformer 10 and as a result, in load line 15. When the voltage in load line 15 reaches the point where the potential at junction point D rises above that of junction point F, transistor 54 will cease conducting, whereby the shaded pole windings 63 and 64 are open circuited and motor 60 is stopped.

Assume, on the other hand, that a sufficient portion of the load is removed from load line 15 so that the secondary voltage in transformer 14 rises above a predetermined desired value. This will cause capacitor 32 to begin charging until the voltage A—B equals the new peak voltage in load line 15. The potential at junction point D will also rise an equal number of volts. Should the new potential at junction point D exceed the potential at junction point E, the transistor 52 emitter potential will exceed its base potential, and said transistor will begin conducting. As a result, the reverse shaded pole windings 65 and 66 of motor 60 will be short circuited, causing rotor 68 to begin turning in a reverse direction. This moves tap changer 18 upwardly thereby increasing the number of turns in the primary winding 12 of transformer 10 which in turn decreases the voltage in load line 15. As the taps are being changed and the transformer 10 secondary voltage decreasing, the potential at junction point D will fall until it reaches a point below the potential at junction point E. Upon this event, transistor 52 will cease conducting and shaded pole windings 65 and 66 will again be open circuited and rotor 68 of motor 60 will again come to rest.

The range of voltages or the operational band width in load line 15 necessary to initiate operation of the device, can be changed by adjusting resistors 42, 48 and 50. For example, by increasing the resistance of resistor 42, the voltage drop between points A and D will also be increased thereby lowering the potential at junction point D. This increases the amount that the potential at junction point D must be raised from any given value in order to exceed the potential at junction point E. On the other hand, the amount that the potential a junction point D must be lowered from said given value, in order to drop it below the potential at junction point F, will be correspondingly decreased. Hence, a greater increase in load line voltage will be necessary to initiate operation of the device at the upper limit of the operational band width, while a smaller decrease in the voltage of the load line will be required to initiate operation at the lower limit. Conversely, should the resistance of resistor 42 be lowered so that the voltage drop between points A and D is correspondingly decreased, the potential at junction point D will be raised. As a result of the latter adjustment, a smaller increase in load line voltage from a given value will be necessary to initiate operation at the upper limit while a large decrease in said voltage will now be necessary to initiate operation at the lower limit.

In a similar manner, by suitably adjusting resistors 48 and 50, the potentials at junction points E and F can be moved closer to or farther away from the nominal potential of junction D so that the amount of change in the load line voltage necessary to initiate operation will change accordingly.

In order to prevent actuation of the device during transient changes in the load voltage, a time delay is introduced by the motor means 30. This is accomplished by choosing a gear reduction means 70 whose output shaft 72 rotates sufficiently slow relative to the shaft 69 of motor 60 that a tap change occurs only upon the occurrence of a relatively permanent voltage change. For example, if the motor 60 has a synchronous speed of 3600 r.p.m. at no load, and the gear ratio is 3600 to 1, and a 60° rotation of output shaft 72 is necessary for one tap change, there will be a time delay of at least 10 seconds. In practice the time delay will be somewhat longer because the motor 60 will be operating under a load.

FIG. 2 shows an alternate embodiment of the invention wherein the large input capacitor 32 has been eliminated. As a result, points D, E, and F will reach the value they achieve in the embodiment of FIG. 1 only during the peaks of the sinusoidal voltage appearing in load lines 15. If this condition were uncorrected, transistors 52' and 54' would operate intermittently. In order to maintain transistors 52' and 54' in their conductive states during the entire alternating current cycle, capacitors 74, 75 and 76 are provided in shunt with junction points D, E and F respectively. In addition, rectifiers 78, 79 and 80 are provided between capacitors 74, 75 and 76 respectively, and their associated junction points to prevent partial discharge of these capacitors when the input voltage falls below its peak value. A resistor 82, 83 and 84 also shunts each of the capacitors 74, 75 and 76 respectively, to prevent them from charging above the peak voltages at their respective junction points due to circulating currents.

Transistors 52' and 54' of the signal comparison means 28' in the embodiment of FIG. 2 are connected to junction points D', E' and F', between rectifiers 78, 79 and 80 and capacitors 74, 75 and 76 respectively, in the same manner that transistors 52 and 54 of the embodiment of FIG. 1 are connected to junction points D, E and F. As a result, transistor 52' will become conductive when the potential at junction point D' exceeds that of junction point E' and transistor 54' will become conductive when the potential at junction point D' falls below that of junction point F'.

Greater sensitivity is achieved in the embodiment of FIG. 2, by placing coupling transistors 86 and 87 in the output circuits of transistors 52' and 54' respectively. These coupling transistors 86 and 87 are of the PNP type and each has its emitter-collector circuit connected to the output terminals of its associated bridge type rectifiers 56 and 58. In addition, the base of each is connected to the emitter of its associated voltage comparison transistors 52' and 54', while their collectors are connected to the collectors of said voltage comparison transistors. These connections result in an amplification of the transistor 52' and 54' output signals so that the amount of current flow between points D' and E' and between D' and F', necessary to initiate operation of the device, is reduced, whereby sensitivity to small changes in load line 15 voltage is increased.

It has been found that when the A.C. input voltage falls slightly outside the normal band width of the device, ripple voltages occurring at points D', E' and F' in FIG. 2, may be sufficient to cause intermittent conduction of transistors 52' and 54'. This condition is eliminated by shunting the emitter and collector of transistors 52' and 54' by capacitors 89 and 90 respectively. These capacitors normally draw charging current from the rectifiers 56 and 58 through the emitters of transistors 86 and 87 respectively. When transistor 52' or 54' is conducting, however, it will present a discharge path for its associated capacitor 89 or 90 so that the latter will not become charged. If the transistor 52' or 54' should become non-conductive for a short time, its capacitor 89 or 90 will continue to draw charging current through transistor 86 or 87 until it becomes fully charged or until transistor 52' or 54' resumes conducting. As a result, motor 60 will continue to run during the short periods that transistors 52' and 54' are non-conductive as a result of such ripple voltages.

If the device is to be utilized in an environment which is subject to elevated temperatures, the leakage currents in transistors 52' and 54' may be appreciable. For example, in the embodiment of FIG. 2, the leakage current in transistor 52' appears as a base current in transistor 86 which, if sufficiently large may cause the latter to begin conducting. Similarly, leakage current in transistor 86 itself may be sufficient to complete the circuit through rectifier 56 and allow the motor 60 to begin operating. This condition is alleviated in the embodiment of FIG. 3 by placing a rectifier 92 in series with the emitter of transistor 86 and a resistor 93 in shunt with the emitter-collector circuit of said transistor. As a result, there is a small current flow through the circuit defined by rectifier 92 and resistor 93 even when transistor 52' is non-conducting. This causes a small voltage drop across rectifier 92 thereby lowering the transistor 86 emitter potential below that of the positive terminal of bridge type rectifier 56 while the base of transistor 52 is held at said positive potential by resistor 94. As a result, transistor 86 is reverse biased, so that it will not become conductive until the transistor 52' emitter current is sufficient to cause a voltage drop in resistor 94 which exceeds the voltage across rectifier 92. A second rectifier 95 is placed between the emitter of transistor 52' and resistor 94 so that capacitor 89 will not cyclicly charge and discharge through resistor 94, rectifier 92 and resistor 93 as the voltage in shading coils 65 and 66 rises and falls. If such charging and discharging of capacitor 89 were not prevented, transistor 86 would be made conductive during each half cycle.

It may also be desirable in applications subject to temperature variations to utilize positive temperature coefficient resistors at 44 and 48 to compensate for changes in the emitter-base voltage of transistor 38 due to such variations. Further, it is also desirable to provide a resistor having a high negative temperature coefficient at 94 in FIG. 3 since less current is necessary to initiate conduction of transistor 86 at elevated temperatures due to a decrease in its biasing voltage as a result of the effect of this temperature increase on rectifier 92.

FIG. 3 shows a further embodiment of the first circuit means 24'. Here, the first circuit means 24' includes a Zener diode 96 and a resistor 97 series connected between terminals A—B of the input capacitor 32. Because the voltage drop across Zener diode 96 will at all times be equal to its Zener voltage, the potential at junction point D, between Zener diode 96 and resistor 97, will be equal to the peak voltage in load line 15 minus the Zener voltage in diode 96. Because the Zener voltage of diode 96 remains constant, it can be seen that the potential at junction point D will change through the same number of volts as the peak voltage in load line 15.

In the alternate embodiment of the second circuit means 26' shown in FIG. 4, the resistors 48 and 50 of the embodiment of FIGS. 1 and 2 are replaced by Zener diodes 98 and 99 respectively. It can be seen that in this embodiment, junction point F, between Zener diodes 98 and 99, will at all times be equal to the potential on terminal B of input capacitor 32 plus the Zener voltage of diode 99. In a similar manner, the potential on junction diode 99. In a similar manner, the potential on junction point E, between Zener diode 98 and resistor 46, will at all times be equal to the potential on terminal B of input capacitor 32 plus the Zener voltage of diode 99 plus the Zener voltage of diode 98. It can be seen that because terminal point B is grounded and because the Zener voltages of diodes 98 and 99 are substantially constant, E and F will at all times be constant regardless of variations in the applied voltage. It will be understood that if desired only one of the resistors 48 or 50 may be substituted by a Zener diode as shown in FIG. 5. Here the potential on junction point F of second circuit means 26" is at all times equal to the Zener voltage of diode 99 while resistors 46 and 48 are proportioned in the same manner as in the embodiments of FIGS. 1 and 2 so that the potential on junction point E is substantially constant.

While the invention has been described with reference to a controlled transformer, it will be understood that it has application with other types of controlled voltage and current regulating apparatus such as capacitor switches, which connect or disconnect capacitors to a system as power factor changes cause variations in the system voltage.

Although only a few embodiments of the invention have been shown and described, many modifications will become obvious to those skilled in the art once applicants' disclosure is known. Accordingly, it is intended to cover in the appended claims, all such modifications which fall within the true spirit of the invention.

We claim:

1. A circuit for controlling the voltage in an electrical system, the combination of a first circuit means connected to said system for producing a first voltage signal whose amplitude varies in accordance with the voltage therein, means for producing a pair of voltage signals having different magnitudes and which are substantially fixed with respect to said first voltage signal, and voltage comparison means connected to said first and second circuit means and including first and second transistor means, the emitter of said first transistor and the base of said second transistor being connected to said first circuit means and the base of said first transistor and the emitter of said second transistor being connected to said second circuit means for receiving a different one of said pair of voltage signals so that said first transistor will become conductive when said first voltage signal rises above one of said pair of voltage signals and said second transistor will become conductive when said first voltage signal falls below the other of said pair of voltage signals, and reversible electroresponsive operator means connected to said first and second transistor means for raising said system voltage when said first transistor becomes conductive and for lowering said system voltage when said second transistor becomes conductive.

2. In a circuit for controlling the voltage in an electrical system including a transformer having a tap changer, a pair of input terminals connected to said system for receiving a potential difference proportional to the voltage therein, first and second circuit means, said first circuit means being connected across said input terminals and having a Zener diode and a resistor connected in series, one of the terminals of said Zener diode being connected to the one of said input terminals of like polarity so that the voltage at the junction of said Zener diode and said resistor varies relative to the other input terminal with variations in said system voltage, said second circuit means including a relatively large resistor and a pair of relatively small resistors serially connected thereto, said second circuit means being connected across said input terminals with said relatively large resistor connected to the one of said input terminals so that the potential at the terminals of one of said relatively small resistors will be substantially fixed relative to the other input terminal, voltage comparison means including a first and second electronic means, said first electronic means being connected to said junction and to one of the terminals of said one relatively small resistor respectively and the said second electronic means being connected to said junction and the other of said resistor terminals respectively, so that said first electronic means will become conductive when the potential at said junction rises above the potential at said one resistor terminal and so that said second electronic means will become conductive when the potential at said junction falls below the potential at the other of said resistor terminals, and reversible electroresponsive means connected to said first and second electronic means and operable to move said tap changer in a first direction when said first electronic means is conductive and for moving it in a second direction when said second electronic means is conductive.

3. In a circuit for controlling the voltage in an electrical system including a transformer having a tap changer, a pair of input terminals connected to said system for receiving a potential difference proportional to the voltage therein, first and second circuit means, said first circuit means being connected across said input terminals and having a Zener diode and a resistor connected in series, one of the terminals of said Zener diode being connected to the one of said input terminals of like polarity so that the voltage at the junction of said Zener diode and said resistor varies relative to the other input terminal with variations in said system voltage, said second circuit means including a relatively large resistor and a pair of relatively small resistors serially connected thereto, said second circuit means being connected across said input terminals with said relatively large resistor connected to the one of said input terminals so that the potential at the terminals of one of said relatively small resistors will be substantially fixed relative to the other input terminal, voltage comparison means including first and second transistors, the emitter and base of said first transistor being connected to said junction and to one of the terminals of said one relatively small resistor respectively, the base and emitter of said second transistor means being connected to said junction and the other of said resistor terminals respectively so that said first transistor will become conductive when the potential at said junction rises above the potential at said one resistor terminal and so that said second transistor will become conductive when the potential at said junction falls below the potential at the other resistor terminal, and reversible shaded pole motor means having a first winding means connected to the emitter and collector of said first transistor through a first rectifier and a second winding means connected to the emitter and collector of said second transistor through a second rectifier, and shaft means mechanically connected to said tap changer for moving the same in a first direction when said first transistor is conductive and for moving it in a second direction when said second transistor is conductive.

4. A circuit for controlling an electrical quantity in a system, a first circuit means connected to said system for producing a first voltage signal whose amplitude varies in accordance with variations in said electrical quantity, a second circuit means for producing a pair of voltage signals having different magnitudes, said electrical quantity being within its normal range when said first voltage signal has a predetermined value relative to said pair of voltage signals, voltage comparison means including first and second transistors, the emitter and base of said first transistor being connected to said first circuit means and to said second circuit means for receiving one of said pair of electrical signals and the base and emitter of said second transistor means being connected to first circuit means and to said second circuit means for receiving the other of said pair of voltage signals, so that said first transistor will become conductive when said first electrical signal bears a predetermined relation to said one of the pair of the voltage signals and so that said second transistor will become conductive when said first electrical signal bears a predetermined relation to said other of said pair of voltage signals, and reversible shaded pole motor means having a first winding means connected to the emitter and collector of said first transistor through a first rectifying means, and a second winding means connected to the emitter and collector of said second transistor through a second rectifying means, and shaft means mechanically connected to said tap changer for moving the same in a first direction when said first transistor is conductive and for moving it in a second direction when said second transistor is conductive, and biasing means for each of said transistors including a first resistor connecting its emitter and one of the terminals of its associated rectifying means and diode means connecting said emitter to the other terminal of said rectifying means, said biasing means also including a second resistor connecting the base of each transistor to the other terminal of its associated rectifying means.

5. A control circuit for maintaining the voltage in a system within preselected limits, the combination of circuit means coupled to said system for sensing changes in said system voltage and for producing voltage signals which vary relative to each other as said system voltage varies relative to said limits, voltage comparison means including first and second transistors each having a forward and reverse biased state, the emitter and base of said first and second transistors being connected to said circuit means for receiving said voltage signals, said circuit means being constructed and arranged to produce voltage signals which place each of said transistors in a biased state when said system voltage is within said limits, said signals changing the biased state of said first transistor when said system voltage rises above said limits and changing the biased state of said second transistor when said system voltage falls below said limits, and reversible electroresponsive means connected to said first and second transistors and operable to lower said system voltage when the biased state of said first transistor is changed and to raise said system voltage when the biased state of said second transistor is changed.

6. A control circuit for maintaining the voltage in a system within preselected limits, the combination of circuit means coupled to said system for producing voltage signals that vary relative to each other in accordance with changes in said system voltage, voltage comparison means including first and second transistors, the emitter and base of said first transistor being connected to said circuit means for receiving a first pair of said voltage signals, the emitter and base of said second transistor being connected to said circuit means for receiving a different pair of said signals, said circuit means being constructed and arranged to produce voltage signals which reverse bias each of said transistors when said system voltage is within said limits, said signals forward biasing said first transistor when said system voltage rises above said limits and forward biasing said second transistor when said system voltage falls below said limits, and reversible electroresponsive means connected to said first and second transistors and operable to vary said system voltage in a first direction when said first transistor is forward biased and to vary said system voltage in the opposite direction when said second transistor is forward biased.

7. A circuit for controlling an electrical quantity in a system, a first circuit means coupled to said system for producing a first electrical signal, a second circuit means coupled to said system for producing a pair of electrical signals which are different from each other, the magnitude of said first signal varying relative to said pair of signals in accordance with variations in said electrical quantity and being between the magnitudes of said pair of signals when the magnitude of said electrical quantity is within a predetermined range of values, first and second sensing means having a control element and a pair of output elements, said sensing means being operable when the amplitude of the electrical signal applied to its control element is less than that applied to one of its output elements, the control element of said first sensing means and one of the output elements of said second sensing means being connected to said first circuit means to receive said first electrical signal, the control element of said second sensing means being connected to said second signal means for receiving one of said pair of signals, one of the output elements of said first sensing means being connected to said second circuit means for receiving the other of said pair of signals, first output means connected to the output elements of said first sensing means for modifying said electrical quantity in a first sense upon the operation of said first sensing means and second output means connected to the output elements of said second sensing means and for modifying said electrical quantity in an opposite sense upon the operation of said second sensing means.

8. A circuit for controlling the voltage in a system, a first circuit means coupled to said system for producing a first voltage signal, a second circuit means coupled to said system for producing a pair of voltage signals which are different from each other, the magnitude of said first signal varying relative to said pair of signals in accordance with variations in said system voltage and being between the magnitudes of said pair of signals when the magnitude of said system voltage is within a predetermined range of values, voltage comparison means including first and second transistors, the emitter and base of said first transistor being connected to said first circuit means and to said second circuit means for receiving said first signal and one of said pair of signals respectively, the base and emitter of said second transistor being connected to said first circuit means and to said second circuit means for receiving said first signal and the other of said pair of signals respectively, so that said first transistor will be forward biased when the first voltage signal rises above the said one of the pair of voltage signals and so that said second transistor will become forward biased when the first voltage signal falls below the other of said pair of signals, and reversible electroresponsive means connected to said first and second transistors and operable to vary said system voltage in a first direction when said first transistor is forward biased and for varying said system voltage in the opposite direction when said second transistor is forward biased.

9. In a circuit for controlling the voltage in an electrical system, first circuit means coupled to said system and having a Zener diode and a resistor connected in series for providing a first voltage signal on the junction therebetween, second circuit means coupled to said system and including resistive voltage dividing means having a pair of terminals for providing a pair of voltage signals having different magnitudes, the magnitude of said first voltage signal being between that of said pair of voltage signals when the voltage in said system is within a predetermined range of values, voltage comparison means including first and second transistors, the emitter and base of said first transistor being connected to said junction and one of said terminals respectively, the base and emitter of said second transistor being connected to said junction and the other of said terminals respectively so that said first transistor will be forward biased when the potential on said junction rises above the potential at said first terminal and so that said second transistor will be forward biased when the potential at said junction falls below the potential at the other terminal and reversible electroresponsive means connected to said first and second transistor and operable to vary said system voltage in a first direction when said first transistor is conductive and for varying said system voltage in the opposite direction when said second transistor becomes conductive.

10. In a circuit for controlling the voltage in an electrical system, a pair of input terminals connected to said system for receiving a potential difference proportional to the voltage therein, first and second circuit means, said first circuit means being connected across said input terminals and having a diode characterized by a substantially constant breakdown potential and a resistance connected in series, one of the terminals of said diode being connected to the one of said input terminals of like polarity so that the voltage at the junction of said diode and said resistance varies relative to the other input terminal with variations in said system voltage, said second circuit means including resistive voltage dividing means having a pair of points thereon and being connected across said input terminals so that the potential at said pair of points will be substantially fixed relative to the other input terminal, voltage comparison means including first and second single circuit elements each having a control terminal and a pair of output terminals, the control terminal and one of the output terminals of said first single circuit element being connected to said junction and to one of the points on said voltage dividing means and the control terminal and one of the output terminals of said second single circuit element being connected to said junction and the other one of the points on said voltage dividing means, said first and second circuit means being constructed and arranged to change the conductive state of said first single circuit element when the potential on said junction has a first predetermined relation to the potential at the one point on said voltage dividing means and to change the conductive state of said second single circuit element when the potential at said junction has a second predetermined relation to the potential at the other point on said voltage dividing means, and reversible electroresponsive means connected to the output terminals of each of said first and second single circuit elements and operable to change the voltage in said system in a first direction when the conductive state of said first electronic means is changed and to change said voltage in the opposite direction when the conductive state of said second electronic means is changed.

11. In a circuit for controlling the voltage in an electrical system, a pair of input terminals connected to said system for receiving a potential difference proportional to the voltage therein, first and second circuit means, said first circuit means being connected across the input terminals and having a Zener diode and a resistance connected in series, one of the terminals of said Zener diode being connected to the one of said input terminals of like polarity so that the voltage at the junction of said Zener diode and said resistance varies relative to the other input terminal with variations in said system voltage, said second circuit means including resistive voltage dividing means having a pair of points thereon and being connected across said input terminals so that the potential at said pair of points will be relatively fixed relative to the other input terminal, voltage comparison means including first and second transistors, the base-emitter circuit of one of said transistors being connected to said junction and one of the points on said voltage dividing means and the base-emitter circuit of said second transistor being connected to said junction and the other one of the points on said voltage dividing means, said first and second circuit means being constructed and arranged to change the conductive state of said first transistor when the potential at said junction has a first predetermined relation to the potential at one of said points on said voltage dividing means and to change the conductive state of said second transistor when the potential at said junction has a second predetermined relation to the potential on the other one of said points on said voltage dividing means, and reversible electroresponsive means connected to said first and second transistors and operable to change the voltage in said system in a first direction when the conductive state of the first transistor is changed and to change the voltage in said system in an opposite direction when the conductive state of said second transistor is changed.

12. A circuit for controlling an electrical quantity in a system, first circuit means connected to said system for producing a first voltage signal whose amplitude varies in accordance with variations in said electrical quantity, a second circuit means for producing a pair of voltage signals having different magnitudes, said electrical quantity being within its normal range when said first voltage signal has a predetermined value relative to said pair of voltage signals, voltage comparison means including first and second transistors, the emitter-base circuit of said first transistor being connected to said first and second circuit means for receiving said first voltage signal and one of said pair of voltage signals and the emitter-base circuit of said second transistor being connected to said first and second circuit means for receiving said first voltage signal and the other of said pair of signals, said first and second circuit means being constructed and arranged to change the conductive state of said first transistor when said first electrical signal bears a predetermined relation to said one of said pair of voltage signals and to change the conductive state of said second transistor when said first electrical signal bears a predetermined relation to said other of said pair of voltage signals, and reversible electroresponsive means connected to said first and second transistors and being operable to change said quantity in a first direction when the conductive state of said first transistor changes and in an opposite direction when the conductive state of said second transistor changes.

13. A circuit for controlling the voltage in an electrical system, the combination of a first circuit means connected to said system for producing a first voltage signal whose amplitude varies in accordance with the voltage therein, means for producing a pair of voltage signals having different magnitudes, said system voltage being within a desired range when said first voltage signal has a predetermined relation to each of said pair of voltage signals, and voltage comparison means connected to said first and second circuit means and including first and second transistors, the emitter of said first transistor and the base of said second transistor being connected to said first circuit means and the base of said first transistor and the emitter of said second transistor being connected to said second circuit means, said first and second circuit means being constructed and arranged to change the conductive state of said first transistor when said first voltage signal rises above one of said pair of voltage signals and to change the conductive state of said second transistor when said first voltage signal falls below the other of said pair of voltage signals, and reversible electroresponsive operating means connected to said first and second transistors for raising said system voltage when the conductive state of said first transistor changes and for lowering said system voltage when the conductive state of said second transistor changes.

14. A circuit for controlling an electrical quantity in a system, first circuit means connected to said system for producing a first electrical signal which varies in accordance with variations in said electrical quantity, a second circuit means for producing a pair of electrical signals, said electrical quantity being within its normal range when said first electrical signal has a predetermined value relative to said pair of electrical signals, electrical signal comparison means including first and second transistors, the emitter-base circuit of said first transistor being connected to said first and second circuit means for receiving said first electrical signal and one of said pair of electrical signals and the emitter-base circuit of said second transistor being connected to said first and second circuit means for receiving said first electrical signal and the other of said pair of electrical signals, said first and second circuit means being constructed and arranged to change the conductive state of said first transistor when said first electrical signal bears a predetermined relation to said one of said pair of electrical signals and to change the conductive state of said second transistor when said first electrical signal bears a predetermined relation to said other of said pair of electrical signals, and reversible electroresponsive means connected to said first and second transistors and being operable to change said quantity in a first direction when the conductive state of said first transistor changes and in an opposite direction when the conductive state of said second transistor changes.

15. A circuit for controlling an electrical quantity in a system, first circuit means connected to said system for producing a first electrical signal which varies in accordance with variations in said electrical quantity, a second circuit means for producing a pair of electrical signals, said electrical quantity being within its normal range when said first electrical signal has a predetermined value relative to said pair of electrical signals, electrical signal comparison means including first and second single electronic circuit elements each having a control terminal and a pair of output terminals, each of said circuit elements being in a conductive state when the electrical signal applied to its control terminal has a predetermined relation to that applied to one of its output terminals and in a nonconductive state when the control terminal signal has a second predetermined relation to the output terminal signal, one of the output terminals and the control terminal of said first electronic circuit element being connected to said circuit means for receiving said first electrical signal and one of said pair of electrical signals and one of the output terminals and the control terminal of said second electronic circuit element being connected to said circuit means for receiving said first electrical signal and the other of said pair of electrical signals, said circuit means being constructed and arranged to change the conductive state of said first electronic circuit element when said quantity rises above said range and to change the conductive state of said second electrical circuit element when said quantity falls below said range, and reversible electroresponsive means connected to said first and second circuit elements and operable to vary said electrical quantity in a first direction when the conductive state of said first circuit element is changed and to vary said electrical quantity in the opposite direction when the conductive state of said second circuit element is changed.

References Cited in the file of this patent

UNITED STATES PATENTS

| | | |
|---|---|---|
| 2,776,382 | Jensen | Jan. 1, 1957 |
| 2,779,899 | Lennox | Jan. 29, 1957 |
| 2,913,657 | Erickson | Nov. 17, 1959 |

OTHER REFERENCES

Transistorized Regulated Power Supplies, Lowry, Electronic Design, Mar. 1, 1956.

Designing Transistor Circuits—D.C. Regulators, Hurley, Electronic Equipment, April 1957.